United States Patent
Jordy et al.

(10) Patent No.: US 7,285,357 B2
(45) Date of Patent: Oct. 23, 2007

(54) ELECTROCHEMICALLY ACTIVE MATERIAL FOR THE POSITIVE ELECTRODE OF AN ELECTROCHEMICALLY RECHARGEABLE LITHIUM CELL

(75) Inventors: Christian Jordy, St Louis de Montferrand (FR); Claudette Audry, Bruges (FR); Jean-Pierre Boeuve, Montussan (FR); Philippe Biensan, Carignan de Bordeaux (FR); Andre Lecerf, Rennes (FR)

(73) Assignee: SAFT, Bagnolet (FR)

( * ) Notice: Subject to any disclaimer, the term of this patent is extended or adjusted under 35 U.S.C. 154(b) by 422 days.

(21) Appl. No.: 10/960,066

(22) Filed: Oct. 8, 2004

(65) Prior Publication Data

US 2005/0112466 A1 May 26, 2005

(30) Foreign Application Priority Data

Oct. 10, 2003 (FR) ................................. 03 11866

(51) Int. Cl.
*H01M 4/58* (2006.01)
(52) U.S. Cl. .................... 429/231.1; 429/231.2; 429/231.3; 429/231.4; 429/231.8; 429/231.6; 423/594.4; 423/599; 423/594.6; 252/182.1
(58) Field of Classification Search ........... 429/231.1, 429/231.2, 231.3, 231.4, 231.8, 231.6; 423/594.4, 423/599, 594.6; 252/182.1
See application file for complete search history.

(56) References Cited

FOREIGN PATENT DOCUMENTS

JP          2003-031219    *    1/2003

OTHER PUBLICATIONS

Patent Abstracts of Japan, Publication No. 11-307094; Nov. 5, 1999, pp. 1-2.
Patent Abstracts of Japan, Publication No. 2003-068298; Mar. 7, 2003, p. 1.
Patent Abstracts of Japan, Publication No. 2003-031219; Jan. 1, 2003, pp. 1-2.

* cited by examiner

*Primary Examiner*—Laura Weiner
(74) *Attorney, Agent, or Firm*—Sughrue Mion, PLLC (57) ABSTRACT

An electrochemically active material resulting from substituting a portion of the nickel in a single-phase composite oxide of nickel and lithium of the $LiNiO_2$ type, characterized in that the active material satisfies the formula:

$$Li(M^1_{(1-a-b-c)}Li_a M^2_b M^3_c)O_2$$

in which: $0.02 < a \leq 0.25$; $0 \leq b < 0.30$; $0 \leq c < 0.30$; $(a+b+c) < 0.50$; $M^3$ is at least one element selected from Al, B, and Ga; $M^2$ is at least one element selected from Mg and Zn; and $$M^1 = Ni_{(1-x-y-z)}Co_x Mn_y M^4_z$$

in which $M^4$ is at least one element selected from Fe, Cu, Ti, Zr, V, Ga, and Si; and $0 \leq x < 0.70$; $0.10 \leq y < 0.55$; $0 \leq z < 0.30$; and $0.20 < (1-x-y-z)$; $b+c+z > 0$; and in that said active material, regardless of its state of charge, satisfies the relationship:

$0.40 < R < 0.90$, where:

$$R = (1-a-b-c)*[3-[(n_U/n_{MA+dox})/(4-2b-3c)]*(2-b-2c)]$$

in which: $n_U$ is the lithium content expressed in moles; $n_{MA}$ is the sum of the contents of Ni, Mn, Co, and $M^4$ expressed in moles; and $d_{ox}$ is the overall degree of oxidation of $M^1$.

15 Claims, 3 Drawing Sheets

ELECTROCHEMICALLY ACTIVE MATERIAL FOR THE POSITIVE ELECTRODE OF AN ELECTROCHEMICALLY RECHARGEABLE LITHIUM CELL

The present invention relates to an electro-chemically active material for use in the positive electrode of an electrochemically rechargeable lithium cell. Naturally, the invention also relates to a positive electrode containing such an active material, and to a lithium cell including such an electrode.

The lithium-containing oxides of transition metals are known as cathode active materials suitable for use in lithium cells, and more particularly $LiNiO_2$ appears to be very promising because of its long lifetime and its high capacity at acceptable cost. A great deal of work has been done seeking to improve the characteristics of the cathode active material $LiNiO_2$ which possesses a high degree of thermal instability, which presents a major risk for user safety. Amongst the solutions that have been envisaged for stabilizing the structure of $LiNiO_2$ during insertion/deinsertion of lithium, substituting a fraction of the nickel with other elements that are less reactive constitutes the solution that has been used the most frequently.

For example, a cathode active material is proposed in document EP-0 782 206 that is based on substituting $LiNiO_2$ with Al and possibly also with Co and/or Mn. However the active material obtained in that way possesses capacity that is not very high and that decreases significantly with increasing Mn content.

Document EP-0 918 041 describes a positive electrode active material whose stability during high temperature cycling is improved. It comprises a complex lithium/nickel/cobalt oxide having the formula:

$$Li_y Ni_{1-(x1+x2)} Co_{x1} M_{x2} O_2$$

where $x_1+x_2=x$; $0.9 \leq y \leq 1.3$: $0<x \leq 0.5$; $0<x_1<0.5$; and $x_2$ depending on M; and in which M is at least one element selected from Al, Fe, Mn, and B.

The overall initial degree of oxidation of the metals Ni, Co, and M is (4-y). Between the initial state and the overcharged state, the metal can thus exchange y electrons. In the overcharged state, there is no longer any lithium, and the structure of the active material thus becomes very unstable in the event of overcharging.

Document U.S. Pat. No. 6,040,090 describes a positive electrode active material having charge/discharge cycling characteristics and initial capacity that are improved. That active material has the following formula:

where $0<a<1.2$; $0.01 \leq b \leq 0.5$; $0.05 \leq c \leq 0.4$; $0.01 \leq d \leq 0.4$; and $0.15 \leq (b+c) \leq 0.5$; and in which M is at least one element selected from B, Al, Si, Fe, V, Cr, Cu, Zn, Ga, and W.

That document describes an active material which contains at least Ni, Co, and Mn and which presents an X-ray diffraction peak at 18.71°±0.25° with a half-height line width less than or equal to 0.22°, and a ratio in the intensities of the [003] and [104] lines of $I_{[003]}/I_{[104]} \geq 0.8$. The drawback of those materials is that they are suitable for becoming strongly charged during overcharging. Consequently, the quantity of residual lithium in those overcharged materials is very small, which makes them highly unstable, thermally.

Document EP-1 189 296 describes a single phase cathode active material of formula:

with $0<x \leq 0.16$; $0.1 \leq y \leq 0.3$; and $0.40 \leq z \leq 0.65$.

Most of those materials present total capacities in the overcharged state that are very high, being greater than 251 milliampere hours per gram (mAh/g). Consequently, the quantities of residual lithium in the overcharged state are less than 0.1 Li/formula. Those materials are therefore highly unstable in the overcharged state.

Document WO $O_2$/073718 describes a positive electrode active material having improved charge/discharge cycling characteristics when charging at a high rate. That active material has the formula:

with $0.001<x \leq 0.10$; $0.001<x' \leq 0.10$
$0 \leq y \leq 0.10$; $0 \leq y' \leq 0.10$
$x+x'+y+y' \leq 0.40$; $0 \leq z \leq 1$ and in which M=B, Mg, Al, Ti, V, Cr, Fe, Co, Cu, Zn.

The examples described in that document present a total capacity in the overcharged state greater than 249 mAh/g which corresponds to a very small quantity of residual lithium (less than 0.1 Li/formula). Those materials are therefore likewise very unstable in the overcharged state.

All of the active materials presently known thus present thermal stability that is still not sufficient for ensuring user safety. Although satisfying most tests performed under abusive conditions (external short circuit test, nail test, . . . ), cells containing such active materials do not withstand the overheating caused by overcharging. During overcharging, a large and sudden temperature rise occurs due to an exothermic reaction between the active material of the electrode and the electrolyte. Given that most of the materials are of highly unstable structure, overheating leads to those active materials being degraded.

An object of the present invention is to propose a rechargeable electrochemical cell that, in comparison with known cells, offers increased user safety in the event of accidental overcharging, while nevertheless possessing the performance expected by the user, particularly in terms of high reversible capacity and long lifetime in cycling. In particular, the invention seeks to propose an electrochemically active material having improved thermal stability, in particular during overcharging at a high rate, thereby minimizing the reaction between the active material and the electrolyte and limiting the resulting thermal runaway.

The present invention provides an insertion compound used as an electrochemically active material for an electrode, which compound results from substituting a portion of the nickel in a composite oxide of nickel and lithium of the $LiNiO_2$ type. The active material of the invention presents in combination the following two characteristics.

Firstly this active material is a single-phase oxide satisfying the following general formula of the $LiMO_2$ type:

in which:
$0.02<a \leq 0.25$;
$0 \leq b<0.30$;
$0 \leq c<0.30$;
$(a+b+c)<0.50$;

$M^3$ is at least one element selected from Al, B, and Ga;
$M^2$ is at least one element selected from Mg and Zn; and in which $M^4$ is at least one element selected from Fe, Cu, Ti, Zr, V, Ga, and Si; and $0 \leq x < 0.70$
$0.10 \leq y < 0.55$
$0 \leq z < 0.30$
$0.20 < (1-x-y-z)$
$b+c+z>0$.

In addition, this active material, whatever its state of charge, also simultaneously satisfies the following relationship R:

$$0.40 < R < 0.90$$

where:

$$R = (1-a-b-c)*[3-[((n_U/n_{MA})+d_{ox})/(4-2b-3c)]*(2-b2c)]$$

in which:
$n_U$ is the lithium content expressed in moles;
$n_{MA}$ is the sum of the contents of Ni, Mn, Co, and $M^4$ expressed in moles; and
$d_{ox}$ is the overall degree of oxidation of $M^1$.

The magnitudes $n_{Li}$, $n_{MA}$ and $d_{ox}$ are measured on a positive electrode that has been washed as follows. After disassembling the electrochemical cell, the electrode is washed under an inert atmosphere in a glove box in a solution of dimethylcarbonate (DMC) to large excess for 12 hours (h) in order to eliminate the lithium coming from the electrolyte salt. Any lithium still present after washing is thus the lithium contained in the active material.

The quantities of Ni, Mn, Co, and M are obtained by inductively coupled plasma (ICP) analysis as follows. 100 milligrams (mg) to 200 mg of active material powder is placed in a leaktight Teflon container having a capacity of about 10 cubic centimeters (cc) into which there is poured a solution of hydrochloric acid (HCl) at a concentration of 6 moles per liter (moles/L) containing 400 mg of potassium iodide KI. The container is subsequently closed in leaktight manner, with the entire operation taking place under an inert atmosphere (argon). The container is subsequently placed in an oven at 40° C. for 12 h. All of the metals in the oxidized state are reduced, consuming I-ions. Analysis by means of a titrated thiosulfate solution enables the quantity of I-ions that have reacted to be measured, and enables the degree of oxidation of the active material to be calculated.

The principle of the invention is to reduce the total chargeable capacity, thus making it possible to conserve a quantity of lithium in the structure that is sufficient to avoid excessive thermal destabilization. For the formula given, the relationship R corresponds to the number of electrons that can be delivered during charging. This number of electrons is conditioned by the difference in degrees of oxidation of the metals represented by $M^1$ between the final state and the initial state.

For a known active material of the $LiNiO_2$ type, the initial degree of oxidation is 3 and the degree of oxidation in the overcharged state (i.e. when the active material has been charged to a capacity much greater than its theoretical capacity, e.g. a charge of 320 mAh/g) is 4. Between these two states, one electron has been exchanged, which corresponds to one atom of lithium that has been deinserted from the structure. In the overcharged state, this active material thus has the composition $NiO_2$. This state is extremely unstable because there no longer exist any atoms in the inter-sheet plane of the crystal structure. The active material thus presents thermal behavior in the overcharged state that is not satisfactory.

Surprisingly, the inventor has found that when the electrochemically active material of the present invention satisfies relationship for R, it presents stability in the overcharged state that is much greater than that of previously known active materials. The lithium content remains high in the overcharged state, thus serving to avoid thermal destabilization of the crystal structure. The present invention thus proposes lamellar oxide compositions such that the positive electrode active material presents very small overchargeable capacity.

In a first embodiment of the invention, $0.60 < R < 0.85$.

In a second embodiment of the invention, a, b, c, x, y, and z satisfy the following condition:

$$[3-(3x+4y+4z)*(1-a-b-c)-(a+2b+3c)]/[(1-x-y-z)*(1-a-b-c)] > 2$$

This formula corresponds to the degree of oxidation of the nickel, which degree must be greater than 2 for the single phase material to exist.

In a third embodiment of the invention, c is not zero, and satisfies the condition: $0 < c$.

In a fourth embodiment of the invention, $M^4$ is titanium Ti, and z is not zero, and satisfies the condition: $0 < z < 0.20$.

In a fifth embodiment of the invention, $M^4$ is Si, and z is not zero, and satisfies the condition: $0 < z < 0.20$.

In a sixth embodiment of the invention, $M^2$ is Mg, and b is not zero, and satisfies the condition: $0 < b < 0.20$.

The present invention also provides a positive electrode for an electrochemically rechargeable lithium cell, the electrode comprising a conductive support covered in an active layer containing the above-described active material. The active layer may also contain a binder and/or a conductive material.

The present invention also provides an electro-chemically rechargeable lithium cell including at least one electrode containing the above-described active material.

In a particular embodiment of the present invention, the electrochemical cell includes the above-described positive electrode.

In another embodiment of the invention, the electrochemical cell further includes a negative electrode whose active material is selected from metallic lithium and a material suitable for inserting lithium into its structure.

Advantageously, the active material of the negative electrode is a carbon-containing material capable of inserting lithium into its structure. The carbon-containing material is preferably selected from graphite, coke, carbon black, and vitreous carbon.

As explained above, an electrochemically active material of the prior art that does not satisfy relationship for R can become almost completely delithiated on being overcharged. Unfortunately, in the delithiated state, the active material becomes highly unstable thermally, which leads to a lower starting temperature for thermal runaway, and also to an exothermic reaction that delivers more energy. As a result, a cell containing such an active material presents overcharged characteristics that are unsatisfactory.

The overcharging test differs from other tests in several respects:
 while overcharging is taking place, the quantity of lithium in the active material decreases strongly, which has the effect of increasing its thermal instability;
 so long as the positive electrode can charge, the negative electrode continues likewise to charge to the extent of depositing metallic lithium; the lithium deposited in this way is extremely reactive.

In contrast, the electrochemically active material of the present invention satisfying relationship for R presents much lower capacity for delithiation in overcharging, thus making it possible to minimize the destabilization of the active material and to minimize the formation of lithium. The thermal behavior of cells using such an active material is thus improved, in particular during high rate overcharging tests (i.e. charging at a rate greater than Ic, which is the current theoretically needed for discharging the cell in one hour).

Other characteristics and advantages of the present invention appear from the following examples, naturally given by way of non-limiting illustration, and from the accompanying drawings, in which.

Figure 3:
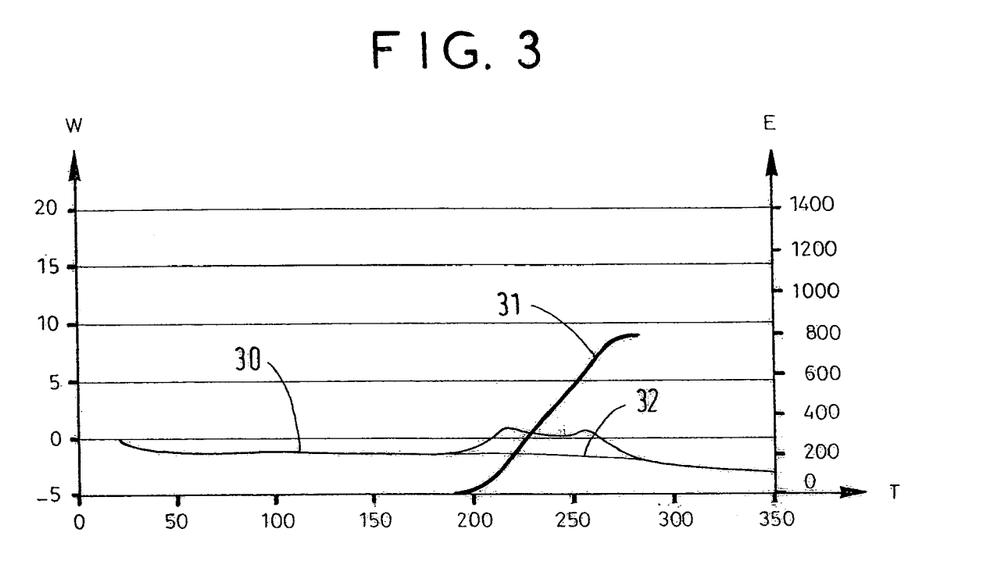
FIG. 3 is a graph showing a curve obtained by differential scanning calorimetry (DSC) applied to an electrode comprising an electrochemically active material of the invention.
Figure 4:
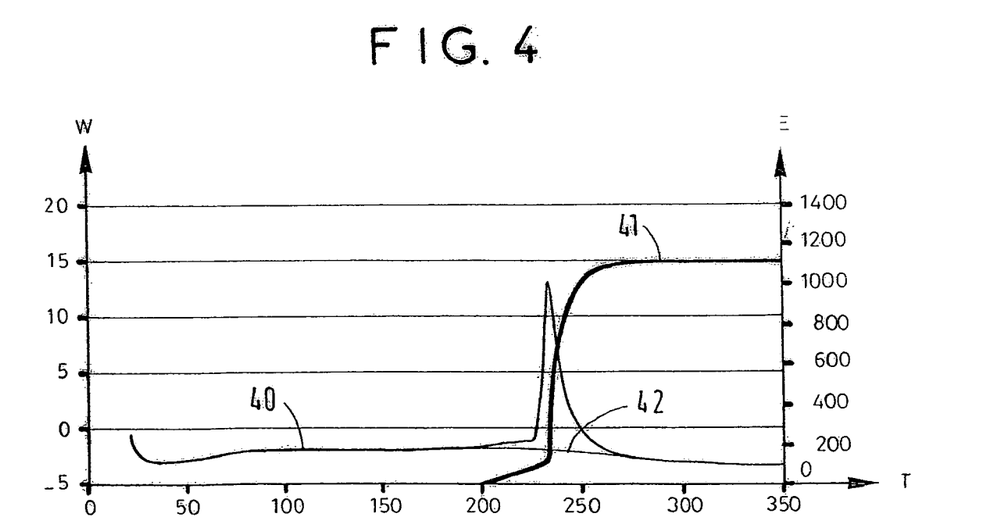
FIG. 4 is a graph analogous to FIG. 3, showing a curve obtained by the DSC method for an electrode comprising an active material that does not form part of the present invention.

In FIGS. 3 and 4, the left ordinate represents thermal power W in watts per gram (W/g) of the active material, the right ordinate represents accumulated thermal energy E in joules per gram (J/g) of active material, and the abscissa represents temperature T in ° C.

Synthesizing the Electrochemically Active Material

The materials were synthesized from a mixture of metal salts in stoichiometric proportions, having a carbonate promoter added thereto, such as hydrogen carbonate, for example. After reaction, the resulting precipitate was filtered and dried. Thereafter, lithium carbonate was used as a lithiation agent, which agent was energetically mixed mechanically with the carbonate promoter in stoichiometric proportions. Heat treatment was then performed in an oven under a flow of oxygen at 900° C. for 24 h.

EXAMPLES 1 TO 12

The elements involved in the composition of the M term in active materials of the form $LiMO_2$ used in examples 1 to 12, i.e. in the expression $(M^1_{(1-a-b-c)}Li_aM^2_bM^3_c)$, are given in Table 1 below, expressed in atomic fractions.

TABLE 1

| Example | Ni | Mn | Co | Li | $M^2$ = Mg | $M^3$ = Al | $M^3$ = B | $M^4$ = Ti | $M^4$ = Si |
|---|---|---|---|---|---|---|---|---|---|
| 1 | 0.50 | 0.28 | 0.14 | 0.07 | 0 | 0 | 0.01 | 0 | 0 |
| 2 | 0.39 | 0.39 | 0.14 | 0.07 | 0 | 0.01 | 0 | 0 | 0 |
| 3 | 0.39 | 0.38 | 0.13 | 0.09 | 0 | 0.01 | 0 | 0 | 0 |
| 4 | 0.36 | 0.37 | 0.13 | 0.13 | 0 | 0 | 0.01 | 0 | 0 |
| 5 | 0.35 | 0.35 | 0.12 | 0.17 | 0 | 0 | 0.01 | 0 | 0 |
| 6 | 0.38 | 0.35 | 0.12 | 0.13 | 0 | 0.02 | 0 | 0 | 0 |
| 7 | 0.36 | 0.33 | 0.13 | 0.13 | 0 | 0.05 | 0 | 0 | 0 |
| 8 | 0.39 | 0.34 | 0.12 | 0.13 | 0 | 0 | 0.02 | 0 | 0 |
| 9 | 0.36 | 0.33 | 0.13 | 0.13 | 0 | 0 | 0.05 | 0 | 0 |
| 10 | 0.37 | 0.32 | 0.13 | 0.13 | 0.05 | 0 | 0 | 0 | 0 |
| 11 | 0.42 | 0.23 | 0.12 | 0.07 | 0 | 0 | 0 | 0.16 | 0 |
| 12 | 0.37 | 0.33 | 0.12 | 0.13 | 0 | 0 | 0 | 0 | 0.05 |

For each of the compositions of Table 1, Table 2 gives the values of a, b, c, x, y, z, $n_{Li}$, $n_{M4}$, and $d_{ox}$, together with the value of R, and the quantity of residual lithium in the overcharged state.

TABLE 2

| Ex. | a | b | c | x | y | z | b + c + z | $d_{ox}M^1$ | R | Residual Li |
|---|---|---|---|---|---|---|---|---|---|---|
| 1 | 0.07 | 0 | 0.01 | 0.15 | 0.30 | 0.00 | 0.01 | 3.15 | 0.78 | 0.29 |
| 2 | 0.07 | 0 | 0.01 | 0.15 | 0.42 | 0.00 | 0.01 | 3.15 | 0.78 | 0.29 |
| 3 | 0.09 | 0 | 0.01 | 0.14 | 0.42 | 0.00 | 0.01 | 3.20 | 0.72 | 0.37 |
| 4 | 0.13 | 0 | 0.01 | 0.15 | 0.43 | 0.00 | 0.01 | 3.30 | 0.60 | 0.53 |
| 5 | 0.17 | 0 | 0.01 | 0.15 | 0.43 | 0.00 | 0.01 | 3.41 | 0.48 | 0.69 |
| 6 | 0.13 | 0 | 0.02 | 0.14 | 0.41 | 0.00 | 0.02 | 3.31 | 0.59 | 0.54 |
| 7 | 0.13 | 0 | 0.05 | 0.16 | 0.40 | 0.00 | 0.05 | 3.32 | 0.56 | 0.57 |
| 8 | 0.13 | 0 | 0.02 | 0.14 | 0.40 | 0.00 | 0.02 | 3.31 | 0.59 | 0.54 |
| 9 | 0.13 | 0 | 0.05 | 0.16 | 0.40 | 0.00 | 0.05 | 3.32 | 0.56 | 0.57 |
| 10 | 0.13 | 0.05 | 0 | 0.16 | 0.39 | 0.00 | 0.05 | 3.38 | 0.51 | 0.62 |
| 11 | 0.07 | 0 | 0 | 0.13 | 0.25 | 0.16 | 0.16 | 3.15 | 0.79 | 0.28 |
| 12 | 0.13 | 0 | 0 | 0.14 | 0.38 | 0.05 | 0.05 | 3.30 | 0.61 | 0.52 |

Figure 1:
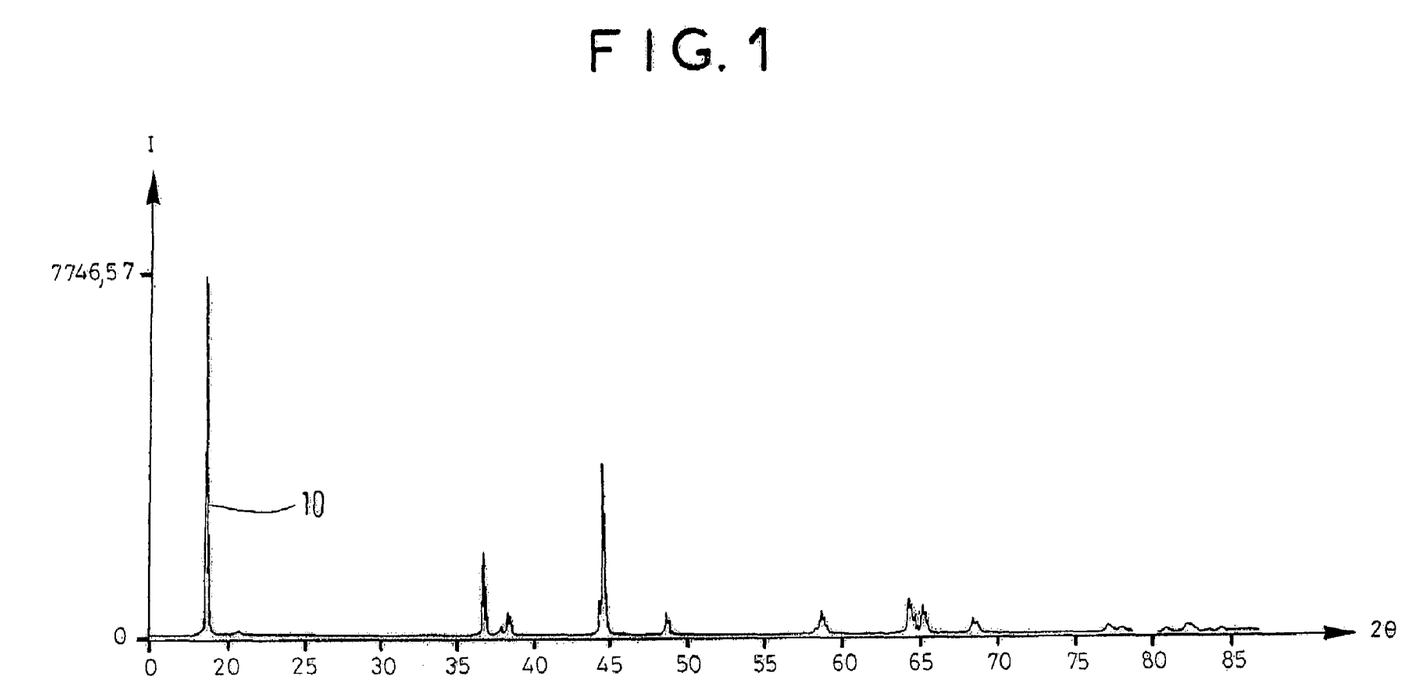
FIG. 1 shows an example of an X-ray diffraction spectrum obtained on an electrochemically active material of the present invention.

The active materials of Tables 1 and 2 have been analyzed by X-ray diffraction using the Kα line of copper. Table 3 gives the values of the half-height line widths and the intensity ratio of the lines [003] and [104]. The active materials of examples 1 to 12 are practically single phase materials. An example of the spectrum obtained is given in FIG. 1, where curve 10 is the X-ray diffraction spectrum for the active material of example 8.

TABLE 3

| Example | Half-height width of the line at $2\theta = 18.71° \pm 0.25°$ | Intensity ratio I[003]/I[104] |
|---|---|---|
| 1 | 0.11 | 1.01 |
| 2 | 0.12 | 1.04 |
| 3 | 0.10 | 1.13 |
| 4 | 0.09 | 1.02 |
| 5 | 0.10 | 1.08 |
| 6 | 0.09 | 1.00 |
| 7 | 0.09 | 1.05 |
| 8 | 0.10 | 1.00 |
| 9 | 0.10 | 0.98 |
| 10 | 0.12 | 1.02 |

TABLE 3-continued

| Example | Half-height width of the line at $2\theta = 18.71° \pm 0.25°$ | Intensity ratio I[003]/I[104] |
|---|---|---|
| 11 | 0.12 | 1.06 |
| 12 | 0.10 | 1.03 |

COMPARATIVE EXAMPLES 1 TO 17

The elements involved in the composition of the M term in active materials of the form $LiMO_2$ used in comparative examples 1 to 17, i.e. in the expression $(M^1_{(1-a-b-c)} Li_a M^2_b M^3_c)$, are given in Table 4, expressed in atomic fractions.

TABLE 4

| Ex. | Ni | Mn | Co | Li | $M^2$ = Mg | $M^2$ = 2n | $M^3$ = Al | $M^3$ = B | $M^4$ = Ti | $M^4$ = Fe |
|---|---|---|---|---|---|---|---|---|---|---|
| C1 | 0.54 | 0.30 | 0.15 | 0.00 | 0.00 | 0.00 | 0.01 | 0.00 | 0.00 | 0.00 |
| C2 | 0.48 | 0.40 | 0.10 | 0.02 | 0.00 | 0.00 | 0.00 | 0.00 | 0.00 | 0.00 |
| C3 | 0.40 | 0.28 | 0.30 | 0.02 | 0.00 | 0.00 | 0.00 | 0.00 | 0.00 | 0.00 |
| C4 | 0.50 | 0.50 | 0.00 | 0.00 | 0.00 | 0.00 | 0.00 | 0.00 | 0.00 | 0.00 |
| C5 | 0.475 | 0.475 | 0.00 | 0.00 | 0.00 | 0.00 | 0.00 | 0.00 | 0.00 | 0.00 |
| C6 | 0.475 | 0.475 | 0.00 | 0.00 | 0.00 | 0.00 | 0.05 | 0.00 | 0.00 | 0.00 |
| C7 | 0.475 | 0.475 | 0.00 | 0.00 | 0.05 | 0.00 | 0.00 | 0.00 | 0.00 | 0.00 |
| C8 | 0.475 | 0.475 | 0.05 | 0.00 | 0.00 | 0.00 | 0.00 | 0.00 | 0.00 | 0.00 |
| C9 | 0.475 | 0.475 | 0.00 | 0.00 | 0.00 | 0.00 | 0.00 | 0.00 | 0.05 | 0.00 |
| C10 | 0.475 | 0.475 | 0.00 | 0.00 | 0.00 | 0.00 | 0.00 | 0.00 | 0.00 | 0.50 |
| C11 | 0.475 | .475 | 0.00 | 0.00 | 0.00 | 0.50 | 0.00 | 0.00 | 0.00 | 0.00 |
| C12 | 0.425 | 0.45 | 0.10 | 0.00 | 0.00 | 0.05 | 0.00 | 0.00 | 0.00 | 0.00 |
| C13 | 0.33 | 0.34 | 0.12 | 0.20 | 0.00 | 0.00 | 0.00 | 0.00 | 0.00 | 0.00 |
| C14 | 0.28 | 0.28 | 0.12 | 0.02 | 0.30 | 0.00 | 0.00 | 0.00 | 0.00 | 0.00 |
| C15 | 0.34 | 0.34 | 0.18 | 0.13 | 0.00 | 0.00 | 0.00 | 0.00 | 0.00 | 0.00 |
| C16 | 0.84 | 0.05 | 0.10 | 0.00 | 0.00 | 0.00 | 0.01 | 0.00 | 0.00 | 0.00 |
| C17 | 0.50 | 0.39 | 0.10 | 0.00 | 0.00 | 0.00 | 0.01 | 0.00 | 0.00 | 0.00 |

For each of the compositions in Table 4, Table 5 gives the values of a, b, c, x, y, z, $n_{Li}$, $n_{MA}$ and $d_{ox}$, together with the value of the relationship R, and the quantity of residual lithium in the overcharged state.

TABLE 5

| Ex. | a | b | c | x | y | z | b + c + z | $d_{ox}M^1$ | R | Residual Li |
|---|---|---|---|---|---|---|---|---|---|---|
| C1 | 0.00 | 0.00 | 0.01 | 0.15 | 0.30 | 0.00 | 0.01 | 3.00 | 1.00 | 0.00 |
| C2 | 0.02 | 0.00 | 0.00 | 0.10 | 0.41 | 0.00 | 0.00 | 3.04 | 0.95 | 0.08 |
| C3 | 0.02 | 0.00 | 0.00 | 0.31 | 0.29 | 0.00 | 0.00 | 3.05 | 0.95 | 0.10 |
| C4 | 0.00 | 0.00 | 0.00 | 0.00 | 0.50 | 0.00 | 0.00 | 3.00 | 1.00 | 0.00 |
| C5 | 0.00 | 0.00 | 0.05 | 0.00 | 0.50 | 0.00 | 0.05 | 3.00 | 0.95 | 0.05 |
| C6 | 0.00 | 0.00 | 0.05 | 0.00 | 0.50 | 0.00 | 0.50 | 3.00 | 0.95 | 0.05 |
| C7 | 0.00 | 0.05 | 0.00 | 0.00 | 0.50 | 0.00 | 0.05 | 3.05 | 0.90 | 0.10 |
| C8 | 0.00 | 0.00 | 0.00 | 0.05 | 0.48 | 0.00 | 0.00 | 3.00 | 1.00 | 0.00 |
| C9 | 0.00 | 0.00 | 0.00 | 0.00 | 0.48 | 0.05 | 0.05 | 3.00 | 1.00 | 0.00 |
| C10 | 0.00 | 0.00 | 0.00 | 0.00 | 0.48 | 0.05 | 0.05 | 3.00 | 1.00 | 0.00 |
| C11 | 0.00 | 0.05 | 0.00 | 0.00 | 0.50 | 0.00 | 0.05 | 3.05 | 0.95 | 0.10 |
| C12 | 0.00 | 0.05 | 0.00 | 0.11 | 0.45 | 0.00 | 0.05 | 3.05 | 0.95 | 0.10 |
| C13 | 0.20 | 0.00 | 0.00 | 0.15 | 0.43 | 0.00 | 0.00 | 3.50 | 0.40 | 0.80 |
| C14 | 0.02 | 0.30 | 0.00 | 0.18 | 0.41 | 0.00 | 0.30 | 3.50 | 0.34 | 0.68 |
| C15 | 0.13 | 0.00 | 0.00 | 0.21 | 0.39 | 0.00 | 0.00 | 3.30 | 0.61 | 0.52 |
| C16 | 0.00 | 0.00 | 0.01 | 0.10 | 0.05 | 0.00 | 0.01 | 3.00 | 0.99 | 0.01 |
| C17 | 0.00 | 0.00 | 0.01 | 0.10 | 0.39 | 0.00 | 0.01 | 3.00 | 0.99 | 0.01 |

The active materials of Tables 4 and 5 were analyzed by X-ray diffraction using the Kα line of copper. Table 6 gives the half-height line width values and the intensity ratios of the lines [003] and [104]. Most of the active materials in the comparative examples 1 to 17 are practically single phase materials, with the exception of comparative examples 13 and 14.

TABLE 6

| Example | Half-height width of the line at $2\theta = 18.71° \pm 0.25°$ | Intensity ratio I[003]/I[104] |
|---|---|---|
| C1 | 0.11 | 0.97 |
| C2 | 0.10 | 0.99 |
| C3 | 0.12 | 1.00 |
| C4 | 0.14 | 0.92 |
| C5 | 0.12 | 0.97 |
| C6 | 0.13 | 0.96 |
| C7 | 0.11 | 1.02 |
| C8 | 0.10 | 0.96 |
| C9 | 0.13 | 0.95 |
| C10 | 0.12 | 0.96 |
| C11 | 0.11 | 0.98 |
| C12 | 0.11 | 0.99 |
| C13 | 0.10 | 1.05 |
| C14 | 0.12 | 1.03 |
| C15 | 0.15 | 0.95 |
| C16 | 0.11 | 1.02 |
| C17 | 0.12 | 0.95 |

Making a Cell

Positive electrodes for rechargeable lithium cells were made as follows. A paste was prepared by mixing 86% by weight of electrochemically active material, 6% by weight of polyvinylidene fluoride (PVDF), and 8% by weight of a carbon-containing conductive material, preferably a mixture made up of 4% soot and 4% graphite, in N-methylpyrolidone (NMP). The resulting paste was deposited on an aluminum foil which serves as the conducive support for the electrode. The electrode was then dried at 140° C. for 1 h, and then calendared.

The positive electrode as previously prepared was then used to make a button-format electrochemically rechargeable cell. The negative electrode comprised a sheet of metallic lithium. The separator used was a membrane of polyethylene (PE) sold by the supplier "Celgard". The storage cell was impregnated with an electrolyte comprising a mixture of polypropylene carbonate, ethylene carbonate, and dimethyl carbonate (PC/EC/DMC) in volume proportions of 1/1/3, and containing lithium hexafluorophosphate $LiPF_6$ at a concentration of 1M. The cells were assembled and filled with electrolyte in a glove box under a moisture-free atmosphere of argon.

Electrochemical Evaluation

The previously prepared cells containing the active materials of examples 1 to 12, and those containing the active materials of comparative examples 1 to 17 were evaluated electrochemically. The first charge was performed at Ic/20 up to a voltage of 4.3 V (where Ic is the theoretical current needed for discharging the nominal capacity Cn of the cell in 1 h), followed by discharging at Ic/20 down to 3 V. The second charge took place in two stages. The first stage consisted in charging at Ic/20 up to 4.3 V. The second stage consisted in charging at Ic/5 for 5 h.

Figure 2:
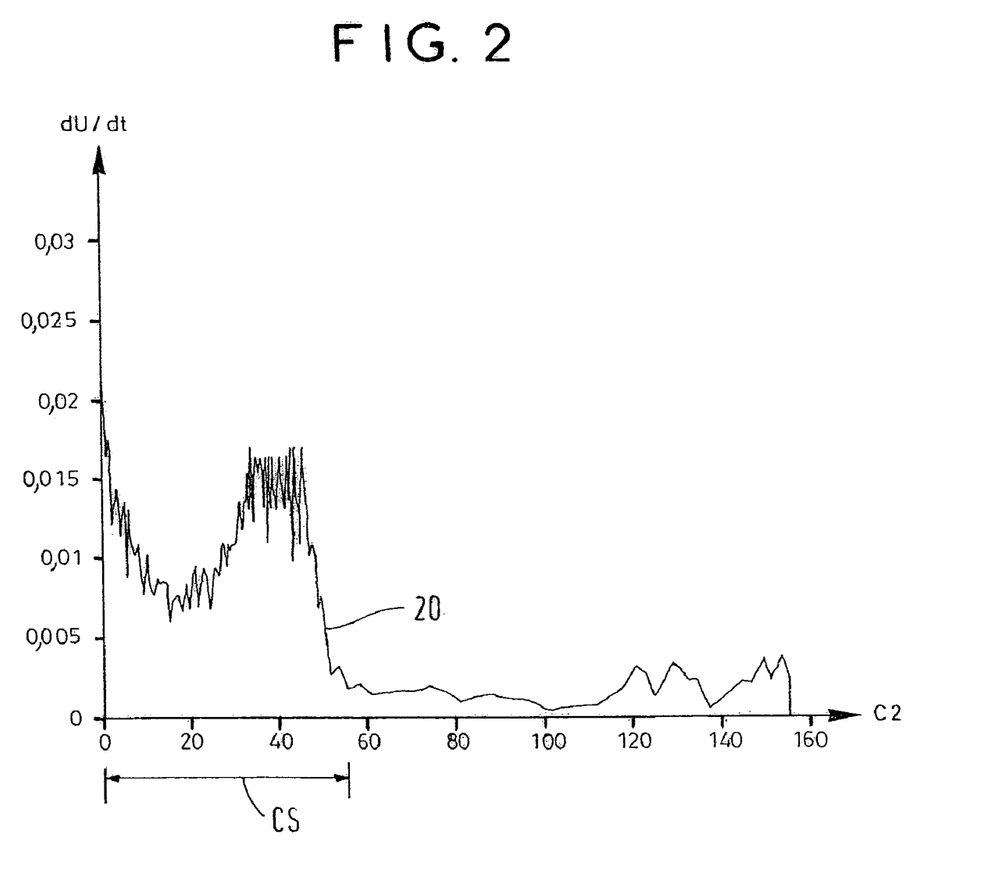
FIG. 2 shows the time derivative dU/dt of the voltage (in volts per hour) as a function of the charged capacity C2 during the second stage of charging (in mAh per gram of active material) for an electrochemically rechargeable lithium cell of the invention.

In order to estimate the overcharged capacity of each material, the time derivative dU/dt of the cell voltage was plotted as a function of the capacity C2 charged during the second stage. FIG. 2 gives an example of a curve 20 as obtained, and the overcharged capacity Cs is also shown.

During the second stage, once the material no longer accepts charge, its voltage stabilizes at a certain value corresponding to oxidation of the electrolyte. Curve 20 thus presents a plateau corresponding to decomposition of the electrolyte. Once the voltage stabilizes, its derivative thus becomes close to 0. The overcharged capacity Cs corresponds to the capacity charged from the beginning of the second stage to the beginning of the plateau.

The total capacity chargeable by the active material is estimated by adding together the capacity charged during the first stage C1 plus the overcharged capacity Cs as determined in this way.

Tables 7 and 8 below, corresponding respectively to examples 1 to 12 and to comparative examples 1 to 17, give the capacity C1 charged during first stage; the overcharged capacity Cs; and the total capacity Ct (sum capacities C1 plus Cs) expressed in mAh/g of material.

TABLE 7

| Example | R | C1 | Cs | Ct |
|---|---|---|---|---|
| 1 | 0.78 | 185 | 41 | 226 |
| 2 | 0.78 | 171 | 56 | 227 |
| 3 | 0.72 | 167 | 44 | 211 |
| 4 | 0.60 | 146 | 34 | 180 |
| 5 | 0.48 | 134 | 16 | 150 |
| 6 | 0.59 | 148 | 30 | 178 |
| 7 | 0.56 | 135 | 35 | 170 |
| 8 | 0.59 | 142 | 36 | 178 |
| 9 | 0.56 | 158 | 14 | 172 |
| 10 | 0.51 | 148 | 7 | 155 |
| 11 | 0.79 | 165 | 55 | 220 |
| 12 | 0.61 | 145 | 33 | 178 |

TABLE 8

| Example | R | C1 | Cs | Ct |
|---|---|---|---|---|
| C1 | 1.00 | 185 | 82 | 267 |
| C2 | 0.94 | 190 | 65 | 255 |
| C3 | 0.93 | 187 | 64 | 251 |
| C4 | 1.00 | 170 | 85 | 255 |
| C5 | 1.00 | 172 | 83 | 255 |
| C6 | 1.00 | 173 | 85 | 258 |
| C7 | 0.90 | 167 | 82 | 249 |
| C8 | 1.00 | 165 | 85 | 250 |
| C9 | 1.00 | 172 | 87 | 259 |
| C10 | 1.00 | 171 | 89 | 260 |
| C11 | 0.90 | 166 | 87 | 253 |
| C12 | 0.90 | 165 | 92 | 257 |
| C13 | 0.40 | 110 | 7 | 117 |
| C14 | 0.34 | 85 | 10 | 95 |
| C15 | 0.61 | 115 | 45 | 160 |
| C16 | 0.99 | 215 | 50 | 265 |
| C17 | 0.99 | 185 | 65 | 250 |

It can be seen that for most of the comparative examples (C1 to C12, C16, and C17), for which the value of R is greater than 0.90, the total charged capacity Ct is much greater ($\geq 249$ mAh/g) than for examples 1 to 12 of active material of the invention ($\leq 227$ mAh/g).

Furthermore, in comparative examples C13 to C15, for which the value of R is less than 0.40, the capacity C1 charged during first charging is less than or equal to 115 mAh/g. Whereas for examples 1 to 12 of active material of the invention, the capacity C1 is greater than or equal to 134 mAh/g.

Thus, the electrochemical cells containing active materials of the present invention present simultaneously both a charged capacity C1 during the first stage that is high, and secondly an overchargeable capacity Cs and a total capacity in the overcharged state Ct that are much smaller than for active materials that do not form part of the invention. Consequently, the active materials of the present invention confer overcharged characteristics to the cell that are improved compared with known active materials.

Thermal Evaluation

After two charge/discharge cycles at ambient temperature, the thermal stability of the previously prepared active materials was evaluated by DSC, which is a technique that determines the variation in the heat flux in a sample subjected to temperature programming. While a material is being heated or cooled, its structure varies and the transformation takes place with exchange of heat. In the present circumstances, an exothermic reaction is observed between the oxygen given off by the positive material and the electrolyte. DSC analysis provides information about the transformation temperature (endothermal or exothermic peak) and about the heat energy required for the transformation (area of the peak).

The electrode used was impregnated in an electrolyte having a PC/EC/DMC volume composition of 1/1/3 and containing 1M $LiPF_6$. In a glove box and under an inert atmosphere (argon), 3 milligrams (mg) of active material in the charged state was taken from the electrolyte-impregnated positive electrode. The sample of active material was placed in a crucible which was then crimped shut under argon. The sample of active material was heated from 20° C. to 500° C. at a rate of 10° C. per minute under argon. DSC analysis provided information about thermal stability of the active material in the charged state, and thus on the behavior of the electrode relative to the electrolyte.

In DSC analysis, the following parameters are characteristic of the thermal stability of a material:
  W is the heat power given off expressed in terms of W/g of active material; when the amplitude of variations in W exceed 5 W/g, the reactions that take place become violent;
  Tp is the temperature in ° C. at which the violent reaction occurs between the overcharged active material and the electrolyte; and
  E is the accumulated thermal energy expressed in J/g of active material plotted as a function of temperature.

FIG. 3 plots, as a function of temperature T: a curve 30 of thermal power W, a curve 31 of total thermal energy E, and a curve 32 representing the base line used for calculating the energy E as obtained by the DSC test for an electrode having as its active material the insertion compound $Li[Ni_{0.38}, Co_{0.12}, Mn_{0.35}, Li_{0.13}Al_{0.02}]O_2$ of example 6 of the invention.

FIG. 4 plots, as a function of temperature T: a curve 40 of thermal power W, a curve 41 of total thermal energy E, and a curve 32 representing the base line used for calculating the energy E as obtained from the DSC test on an electrode having as its active material the insertion compound $Li[Ni_{0.54}, Co_{0.15}, Mn_{0.30}, Al_{0.02}]O_2$ of comparative example C1.

The results of the DSC test show that the active material of example 6 presents thermal stability greater than the active material of comparative example C1 which does not form part of the invention. The comparative active material C1 presents a thermal power amplitude of about 15 W/g with an accumulated thermal energy of 1200 J/g, while the active material of example 6 presents a thermal power of less than 5 W/g and an accumulated thermal energy of less than 800 J/g. The active material of the present invention of example 6 thus presents thermal stability characteristics that are greatly improved compared with the active material of comparative example C1.

Naturally, the present invention is not limited to the embodiments described, and it can be subjected to numerous variants accessible to the person skilled in the art without departing from the spirit of the invention. In particular, without going away from the ambit of the invention, it is possible to envisage using a conductive support for the electrode of different kind and structure. Finally, the various ingredients used in making the paste, and their relative proportions could be changed. In particular, additives for making it easier to form the electrode, such as a texture stabilizer or thickener, could be incorporated therein in minor proportions.

The invention claimed is:

1. An electrochemically active material resulting from substituting a portion of the nickel in a single-phase composite oxide of nickel and lithium of the $LiNiO_2$ type, characterized in that the active material satisfies the formula:

$$Li(M^1_{(1-a-b-c)}Li_aM^2_bM^3_c)O_2$$

in which:
  $0.02 < a \leq 0.25$;
  $0 \leq b < 0.30$;
  $0 \leq c < 0.30$;
  $(a+b+c) < 0.50$;
  $M^3$ is at least one element selected from Al, B, and Ga;
  $M^2$ is at least one element selected from Mg and Zn; and
  $M^1 = Ni_{(1-x-y-z)}Co_xMn_yM^4_z$
in which $M^4$ is at least one element selected from Fe, Cu, Ti, Zr, V, Ga, and Si; and
  $0 \leq x < 0.70$
  $0.10 \leq y < 0.55$
  $0 \leq z < 0.30$
  $0.20 < (1-x-y-z)$
  $b+c+z>0$;
and in that said active material, regardless of its state of charge, satisfies the following relationship:

$$0.40 < R < 0.90$$

where:

in which:
  $n_U$ is the lithium content expressed in moles;
  $n_{MA}$ is the sum of the contents of Ni, Mn, Co, and $M^4$ expressed in moles; and
  $d_{ox}$ is the overall degree of oxidation of $M^1$.

2. An active material according to claim 1, in which $0.60 < R < 0.85$.

3. An active material according to claim 1, in which a, b, c, x, y, and z satisfy the following condition:

4. An active material according to claim 1, in which $0 < c$.

5. An active material according to claim 1, in which $M^4$ is Ti and $0 < z < 0.20$.

6. An active material according to claim 1, in which $M^4$ is Si and $0 < z < 0.20$.

7. An active material according to claim 1, in which $M^2$ is Mg and $0 < b < 0.20$.

8. A positive electrode for an electrochemically rechargeable lithium cell comprising a conductive support covered in an active layer containing an electro-chemically active material resulting from substituting a portion of the nickel in a single-phase composite oxide of nickel and lithium of the $LiNiO_2$ type, characterized in that the active material satisfies the formula:

$$Li(M^1_{(1-a-b-c)}Li_aM^2_bM^3_c)O_2$$

in which:
 0.02<a≦0.25;
 0≦b<0.30;
 0≦c<0.30;
 (a+b+c)<0.50;
 $M^3$ is at least one element selected from Al, B, and Ga;
 $M^2$ is at least one element selected from Mg and Zn; and $$M^1=Ni_{(1-x-y-z)}Co_xMn_yM^4_z$$

in which $M^4$ is at least one element selected from Fe, Cu, Ti, Zr, V, Ga, and Si; and
 0≦x<0.70
 0.10≦y<0.55
 0≦z<0.30
 0.20<(1-x-y-z)
 b+c+z>0;
and in that said active material, regardless of its state of charge, satisfies the following relationship:

$$0.40<R<0.90$$

where:

$$R=(1-a-b-c)*[3-[(n_U/n_{MA}+d_{ox})/(4-2b-3c)]*(2-b-2c)]$$

in which:
 $n_U$ is the lithium content expressed in moles;
 $n_{MA}$ is the sum of the contents of Ni, Mn, Co, and $M^4$ expressed in moles; and
 $d_{ox}$ is the overall degree of oxidation of $M^1$.

9. A positive electrode according to claim 8, in which said active layer further includes a binder.

10. A positive electrode according to claim 8, in which said active layer further includes a conductive material.

11. An electrochemically rechargeable lithium cell including at least one electrode containing an active material resulting from substituting a portion of the nickel in a single-phase composite oxide of nickel and lithium of the $LiNiO_2$ type, characterized in that the active material satisfies the formula:

$$Li(M^1_{(1-a-b-c)}Li_aM^2_bM^3_c)O_2$$

in which:
 0.02<a≦0.25;
 0≦b<0.30;
 0≦c<0.30;
 (a+b+c)<0.50;
 $M^3$ is at least one element selected from Al, B, and Ga;
 $M^2$ is at least one element selected from Mg and Zn; and $$M^1=Ni_{(1-x-y-z)}Co_xMn_yM^4_z$$

in which $M^4$ is at least one element selected from Fe, Cu, Ti, Zr, V, Ga, and Si; and
 0≦x<0.70
 0.10≦y<0.55
 0≦z<0.30
 0.20<(1-x-y-z)
 b+c+z>0;
and in that said active material, regardless of its state of charge, satisfies the following relationship:

$$0.40<R<0.90$$

where:

$$R=(1-a-b-c)*[3-[(n_U/n_{MA}+d_{ox})/(4-2b-3c)]*(2-b-2c)]$$

in which:
 $n_U$ is the lithium content expressed in moles;
 $n_{MA}$ is the sum of the contents of Ni, Mn, Co, and $M^4$ expressed in moles; and
 $d_{ox}$ is the overall degree of oxidation of $M^1$.

12. An electrochemically rechargeable lithium cell according to claim 11, wherein the at least one electrode is a positive electrode.

13. An electrochemically rechargeable lithium cell according to claim 12, further including a negative electrode of active material selected from metallic lithium and a material suitable for inserting lithium in its structure.

14. An electrochemical cell according to claim 13, including a negative electrode whose active material is a carbon-containing material capable of inserting lithium in its structure.

15. An electrochemical cell according to claim 14, in which said carbon-containing material is selected from graphite, coke, carbon black, and vitreous carbon.

* * * * *